United States Patent [19]

Boetcker

[11] Patent Number: 4,909,235
[45] Date of Patent: Mar. 20, 1990

[54] COOKING STOVE

[76] Inventor: Richard Boetcker, 104 Plumtree La. #19L, Midvale, Utah 84047

[21] Appl. No.: 334,439

[22] Filed: Apr. 7, 1989

[51] Int. Cl.⁴ .................................................. F24C 1/16
[52] U.S. Cl. ..................................... 126/9 R; 126/9 B; 126/25 R; 126/25 C; 126/290
[58] Field of Search ................... 126/9 R, 286, 25 R, 126/9 A, 290, 9 B, 285 A, 25 B, 25 C, 285 R, 289, 41 R, 215, 15 R

[56] References Cited

U.S. PATENT DOCUMENTS

| 607,642 | 7/1898 | Botelho | 126/25 R |
|---|---|---|---|
| 2,662,965 | 12/1953 | Becker | 219/35 |
| 2,819,667 | 1/1958 | Victor | 99/339 |
| 2,866,883 | 12/1958 | Borden | 219/35 |
| 3,327,698 | 6/1967 | Leslie | 126/25 R |
| 3,327,699 | 6/1967 | Uden | 126/25 R |
| 3,330,266 | 7/1967 | Stephen | 126/25 R |
| 3,339,505 | 9/1967 | Bean | 126/25 B |
| 3,396,715 | 8/1968 | Allen | 126/25 R |
| 3,407,803 | 10/1968 | Cervenak | 126/25 R |
| 3,500,812 | 3/1970 | Korngold | 126/25 R |
| 3,529,557 | 9/1970 | Treanor | 126/25 B |
| 3,613,657 | 10/1971 | Wilska | 126/41 R |
| 3,638,635 | 2/1972 | Drennan | 126/41 R |
| 3,667,376 | 6/1972 | Thompson | 126/25 AA |
| 3,789,822 | 2/1974 | Schantz | 126/41 R |
| 3,827,423 | 8/1974 | Bolitho | 126/25 R |
| 3,887,786 | 6/1975 | Witt et al. | 99/341 |
| 3,959,620 | 5/1976 | Stephen, Jr. | 126/41 R |
| 3,987,719 | 10/1976 | Kian | 99/426 |
| 4,006,676 | 2/1977 | Adamis | 126/215 |
| 4,175,925 | 11/1979 | Paek et al. | 126/25 B |
| 4,198,561 | 4/1980 | Fujioka | 99/444 |
| 4,216,370 | 8/1980 | Charvat | 219/460 |
| 4,281,633 | 8/1981 | Wackerman | 126/25 C |
| 4,332,188 | 6/1982 | Rhear | 99/427 |
| 4,413,609 | 11/1983 | Tisdale | 126/25 R |
| 4,430,559 | 2/1984 | Rabay | 126/25 R |
| 4,492,853 | 1/1985 | Lam | 219/432 |
| 4,539,973 | 9/1985 | Hait | 126/9 R |
| 4,592,334 | 6/1986 | Cogan, Jr. | 126/25 B |
| 4,603,679 | 8/1986 | Ogden | 126/25 B |

FOREIGN PATENT DOCUMENTS

| 577278 | 9/1924 | France | 126/9 R |
|---|---|---|---|
| 92623 | 6/1923 | Japan | 126/25 C |

Primary Examiner—James C. Yeung
Attorney, Agent, or Firm—Thorpe, North & Western

[57] ABSTRACT

A cooking stove useful for all types of cooking, having a semi-conical outer housing and an inverted semi-conical firebox inserted therein. The firebox has a set of openings in its periphery towards the bottom portion thereof which the covered by a ring having similar openings which can be rotated to allow air to flow into the firebox or to prevent the flow of air into the firebox. The housing also has openings which allows air to flow into the area between the housing and the firebox. The interior of the firebox contains a fuel rack upon which fuel such as charcoal briquets or the like may be placed and ignited. The stove can be covered with a grill upon which food may be cooked, or other utensils may be placed on the stove such as wok, a Dutch oven, a steamer, etc. Air flows through the housing and through the venting ring into the firebox where it is heated by the fuel, and then moves upwardly through the firebox to heat the food placed on a grill or in a cooking utensil located at the top opening of the firebox. Because of the distance between the fuel and the top opening of the firebox, food is substantially heated by the rising hot air, instead of by the radiant heat of the burning coals as in prior art devices.

18 Claims, 3 Drawing Sheets

COOKING STOVE

BACKGROUND OF THE INVENTION

The invention relates to a portable cooking stove which can be adapted to accommodate all methods of food preparation.

Outdoor cooking stoves such as barbecue grills and the like have been popular for many years. These grills generally comprise a heat source such as gas or charcoal type fuel located below a grill. The grill can be used to cook food directly thereon, or it can be used in conjunction with other cooking utensils such as a pan or grill. Such prior art devices are extremely limited in their usefulness since many methods of cooking cannot be performed therewith.

Also, prior art barbecue grills and the like have not been well adapted even for their intended use. For example, prior art grills often cause food, especially meats and the like, to burn extensively due to the relatively short distance between the fuel and the cooking food, and due to extensive burning of the food caused by flare-ups when portions of the food, especially grease, fall from the grill into the burning fuel and ignite. Further, prior art grills generally tend to be inadequately vented, causing the fuel to burn less than efficiently. This makes it difficult to control the heat produced in the grill, and causes the food to become tainted by smoke containing unburned fuel, ash, lighter fluid and the like.

SUMMARY OF THE INVENTION

It is an object of the invention to provide a portable cooking device which is adaptable for use in all methods of cooking.

It is also an object of the invention to provide a means for effectively controlling airflow through the heating fuel to allow efficient burning and heat control.

It is also an object of the invention to provide such a device which is relatively safe and easy to use.

The above and other objects are realized in a specific illustrative embodiment of a cooking stove having; a semiconical outer housing comprising annular shaped venting holes located around the periphery close to the base and close to the top edge thereof and legs extending away from the base, and a bottom plate closing off the bottom opening thereof; a semi-conical firebox having a lip formed in a top opening and circular holes formed in its periphery next to a bottom opening thereof and a plate covering the bottom opening which supports an expanded wire mesh fuel rack, the lip formed in the firebox being sized to fit over the upper opening in the outer housing; a venting system comprising a semi-conical ring sized to fit around the exterior of the bottom portion of the firebox having circular holes in the periphery thereof which coincide with the holes in the periphery of the firebox next to its bottom opening, the ring having a vent control arm located exteriorly of the housing which allows manipulation thereof; a circular grill of expanded wire mesh sized to extend over the opening of the firebox to securely rest on the lip portion thereof; and a snuffing plate attached to the housing by a chain, which can be placed in the firebox just above the fuel rack and which, when used in conjunction with the vent ring, will seal off the fuel rack area of the firebox from airflow in order to stop combustion of the fuel.

The firebox is shaped and designed to allow for the placement of a conventional frying pan on top of the grill, or for the removal of the grill and the placement of other cooking devices therein such as a wok, deep kettle, steamer or a Dutch oven.

A second illustrative embodiment of the invention is generally pyramidal in shape and has a grill which has three hinged together portions, the first portion functioning to divide the firebox into two separate compartments, the second portion functioning to cover one compartment at the top thereof in the common fashion of a grill, and the third portion functioning to cover the top of the other compartment of the firebox. The third portion having a circular opening therein for accommodating various cooking utensils such as a wok or Dutch oven.

The grill is used by placing coals on the fuel rack with sufficient amounts of lighter fluid added thereto to ensure complete and even lighting. The vent openings are adjusted to prevent airflow therethrough to allow for ease of ignition of the coals, then readjusted to allow the proper flow of air into and around the coals to insure sufficient air for complete burning of the lighter fluid. Air passes from the vent, around the heated coals, and up to the top opening of the firebox. Food can then be placed at the top opening of the firebox either by placing it on a grill, placing it in a pan which is placed on the grill or by removing the grill and placing the food in another cooking utensil such as a wok, Dutch oven, a steamer or the like, and placing the utensil in the opening. The particular number and arrangement of coals on the fuel rack and/or around the cooking utensil can be adjusted to ensure the proper heat is generated for the particular cooking method. Because of the great distance between the fuel rack and the top opening of the firebox, food which is cooked on a grill which is placed over the top opening of the firebox tends to be cooked in the heated air rising from the coals on the fuel rack, instead of by radiant heat coming directly from the coals themselves as is the case with prior art devices.

When it is desired to put the coals out, a snuffing plate can be placed inside the firebox, which, when used in conjunction with the venting ring, can completely prevent airflow to the burning coals. Combustion of the coals is then arrested within a matter of minutes.

BRIEF DESCRIPTION OF THE DRAWINGS

The above and other objects, features and advantages of the invention will become apparent from a consideration of the following detailed description presented in conjunction with the accompanying drawings in which.

DETAILED DESCRIPTION

Figure 1:
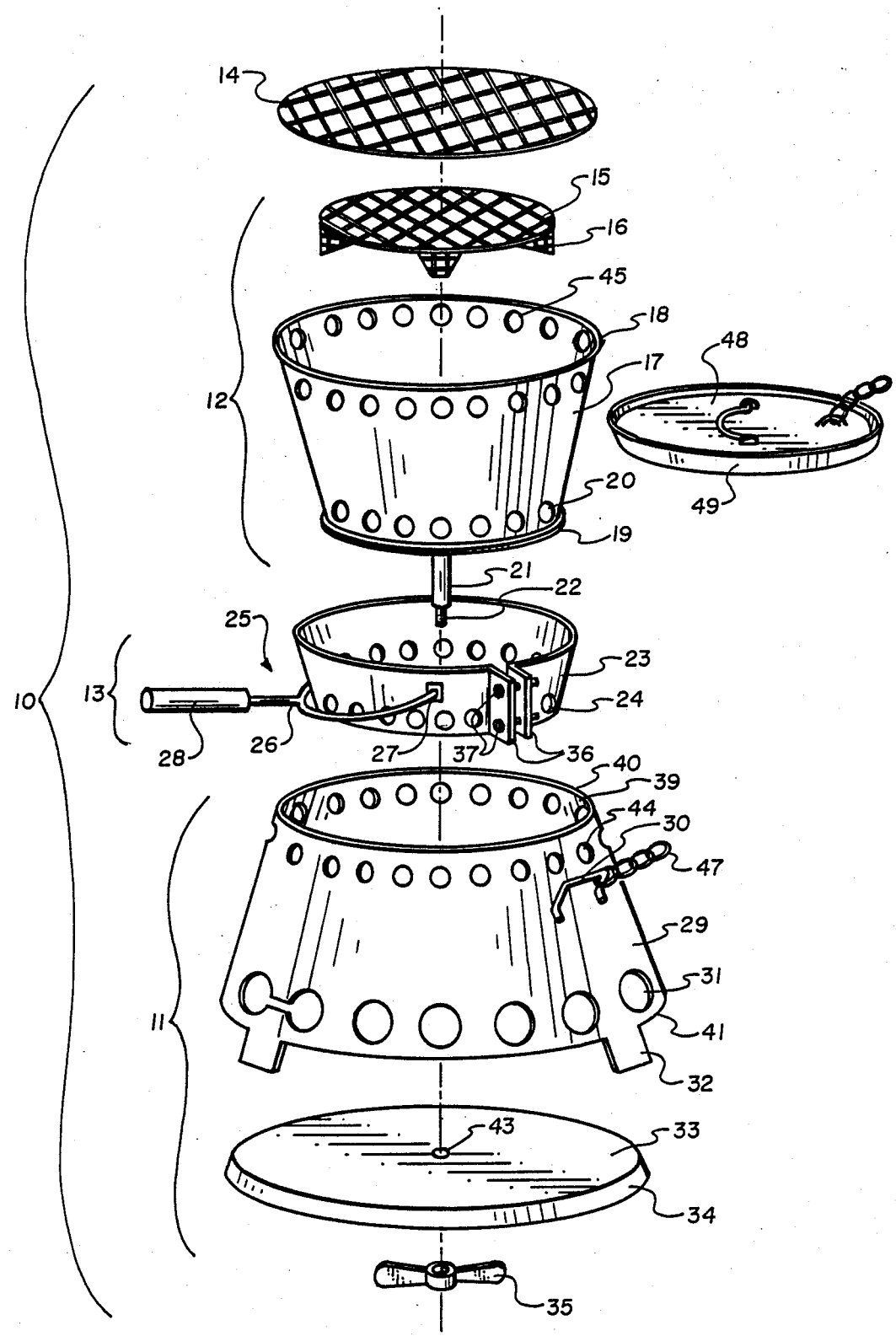
FIG. 1 is an expanded perspective view of the preferred embodiment of the present invention.

Referring to FIG. 1, there is shown a cooking stove 10 having a housing 11, a firebox 12, a venting system 13, and a grill 14. The housing 11 is made up of a housing body 29 which is of a generally semi-conical shape. The top opening 39 of housing body 29 being of a diameter which is less than the diameter of the bottom opening 41. Housing 29 further comprises openings 31 and 44 which allow airflow into the firebox 12 as will be explained later.

Legs 32 which are preferably integral with the housing body 29 extend beyond the bottom opening 41 of the housing body 29 a distance of approximately 1½ inches. Handle opening 38 allows a portion of the venting system 13 to pass from the firebox 12 to extend from the exterior of the stove 10 to allow exterior manipulation thereof. Non-heat conducting handles 30, attached to the outer surface of housing body 29, are used for transporting the device.

Figure 2:
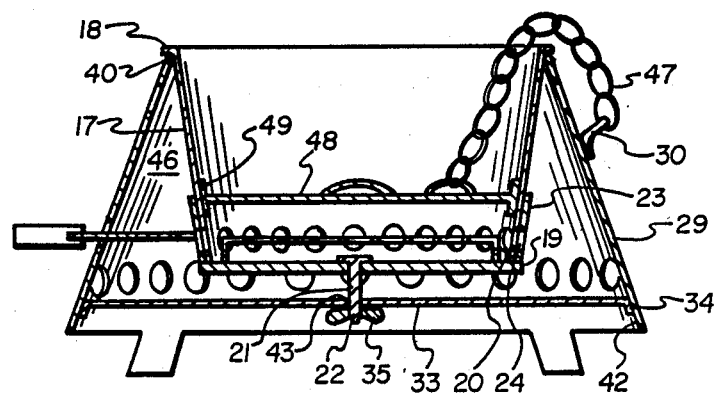
FIG. 2 is a cross-sectional view of the present invention with the grill removed and the snuffing plate inside the firebox.

Housing 11 also comprises housing bottom plate 33 which is of a diameter such that it will fit into bottom opening 41 of the housing body 29. A bottom plate lip 34 is angled such that it will lie flush with the interior surface of housing 29 when in place. As best seen in FIG. 2, when bottom plate 33 is in place inside the housing 29, bottom plate lip 34 contacts the interior surface 42 at a position slightly above the bottom opening 41.

Referring again to FIG. 1, firebox 12 comprises a semi-conical body 17 having an upper lip 18 at its top opening, and vent openings 45 in its periphery adjacent to the top opening. Vent openings 20 are located in its periphery near its bottom opening. A bottom plate 19 is attached to the firebox body 17 to cover the bottom opening. Bolt 21, having bolt threads 22, is located through the center of the firebox bottom plate 19 and, as best seen in FIG. 2, is of the proper dimension to pass through the hole 43 in housing bottom plate 33 and be securely fixed in place by wing nut 35. When the firebox 12 is in place in the housing body 29, lip 18 of the firebox body 17 matches the diameter of the rim 40 of top opening 39.

Because of the semi-conical shape of housing body 29, a large open area 46 is created between the bottom and sides of the firebox 12 and the housing body 29 when they are assembled for use. This large space effectively keeps heat, generated in the firebox, away from the housing body 29 and greatly increasing the safety of the device.

The firebox 12 may also be conically shaped if desired, having its smallest diameter at the bottom. A conically shaped firebox body 17 would allow an even greater open area 42. The shape of the firebox body 17 also allows for the creation of a draft which is extremely useful for airflow therethrough as will be explained later. The large area of the housing bottom, relative to its top, also greatly increases the safety of the stove by making it almost impossible to tip over as a result of any accidental jarring.

The venting system 13 is comprised of a semi-conical ring 23 and a vent control arm 25. The semi-conical ring 23, as best seen in FIG. 1, comprises openings 24, vent ring flanges 36 and vent bolts 37. The flanges 36 and bolts 37 are useful in the formation of the ring as will be explained later. The vent control arm 25 comprises a handle 28 attached to fork 26. The ends of fork 26 are fitted into holes 27 in the ring 23. As is best seen in FIG. 2, ring 23 has an interior diameter which is just slightly larger than the exterior diameter of the bottom portion of the firebox body 17.

As also best seen in FIG. 2, the ring 23 is held in place around the firebox body 17 by a portion of the firebox bottom plate 19 which extends beyond the firebox body 17. The vent openings 24 in ring 23, and the vent openings 20 in firebox body 17, are located such that they will match up with each other when the ring 23 is correctly placed around the firebox 17. Vent control arm 25 passes through handle openings 38 in housing body 29 and can be moved by the user to rotate ring 23 relative to firebox body 17. This rotation causes alignment or misalignment of the vent openings 24 in ring 23 with the vent openings 20 in firebox body 17. The openings 24 and 20 are oriented to make it possible to completely align all openings to allow for maximum airflow, or to completely misalign all the openings to allow for zero airflow.

Firebox 12 also comprises coal rack 15 which is of generally circular shape and which is of a diameter small enough to be placed in the bottom of the firebox on the bottom plate 19. Coal rack 15 must have extensive openings to allow for airflow to pass therethrough, and also has legs 16 which rest on bottom plate 19 and hold the rack a sufficient distance thereabove to allow for free airflow around and beneath the rack. The rack 15 is placed in the firebox 12 at a level approximately equivalent to the level of the vent openings 20.

In use, coal such as charcoal briquets are placed on coal rack 15 and ignited. If lighter fluid is used, the top surface of plate 19 may be formed in an uneven manner such that the fluid will lead to pool in areas thereof directly beneath the fuel rack 15. Openings 31 in housing body 29 can be initially closed to prevent any gusts of air from extinguishing the match or other flame when lighting, then opened to allow large amounts of air to pass into the area between the housing body 29 and firebox body 17 to allow complete burning of the lighter fluid during the starting period. Venting ring 23 is then adjusted by means of vent control arm 25 to uncover the correct amount of vent openings 20 to allow for the desired airflow into and through the interior of the firebox body 17 for the type of cooking to be done. Air flowing in through vent openings 20 passes over, beneath and through a coal rack 15 and is heated by the burning charcoal. The heated air then is pulled up through the firebox body 17. The shape of the firebox body 17 aids in drafting the hot air up and out through the top of the stove. The rising hot air pulls more air through openings 20 which in turn pulls more air through housing openings 31. Thus, a continuous stream of air is supplied to the firebox 12. This continuous stream of air allows the user to effectively control the burning rate of the charcoal inside the firebox, and also the heat generated by the rising hot air at the top opening of the firebox body 17. Since rising hot air pulls air through the vent openings 20 and 24, there is no need to orient the stove 10 to take advantage of wind direction.

The stove 10 can comprise a grill 14 of a circularly shaped expanded wire mesh or the like which is of a diameter equal to the diameter of firebox lip 18, and can contain any well-known means for securing its attachment thereto. As can be seen in FIG. 2, there is a relatively large distance between the burning charcoal and the surface of the grill 14. However, because of the drafting abilities of the venting system 13, sufficient hot air is forced through the system up to the grill 14 to allow the hot air to be of a temperature sufficiently high for all cooking purposes. This concept of cooking substantially with hot air generated by the burning charcoal, instead of by flames or radiant heat coming directly from the charcoal, is an important part of the present invention.

Figure 3:
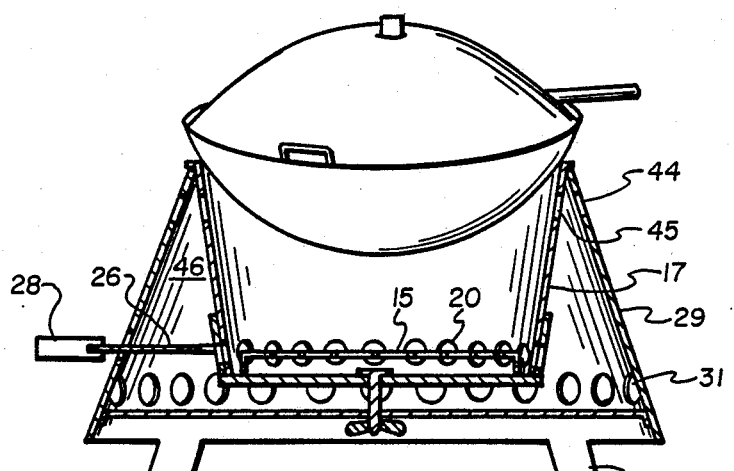
FIG. 3 is a partially cross-sectional view of the present invention with the grill removed and a wok placed therein.

Food can be placed directly on grill 14 or can be placed into another cooking utensil such as a pot or frying pan which is placed on grill 14. Further, as can be seen in FIG. 3, the grill 14 can be completely removed from the stove and other cooking utensils such as a wok can be placed thereon. It is contemplated that the lip 18 of the firebox body 17 be of a diameter which allows for a standard wok to be placed thereon such that approximately ⅔ of the bottom of a wok rests below the level of the lip 18.

Figure 4:
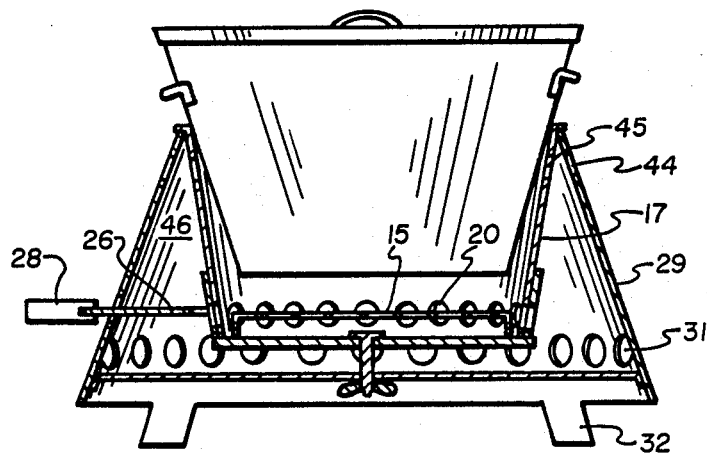
FIG. 4 is another partially cross-sectional view of the present invention with the grill removed and a Dutch oven placed therein.

As seen in FIG. 4, grill 14 can also be removed to allow the placement of a Dutch oven into the firebox 12 of the stove 10. The contemplated dimensions of the firebox 12 would allow a standard Dutch oven, such as a 12 inch diameter Dutch oven, to be placed directly into the firebox with the bottom thereof resting approximately two inches above the charcoal, and the handles thereof remaining slightly above the lip 18.

When cooking has been completed on the stove 10, the remaining fuel may be extinguished with the use of the snuffer plate 48 in conjunction with venting system 13. The snuffer plate 48 is placed into the firebox where the snuffer plate rim 49 rests adjacent the inside of firebox body 17 in an airtight manner, as best seen in FIG. 2. The vent ring 23 is then rotated by means of handle 28 until openings 24 are completely misaligned from openings 20 in the firebox body 17. When the snuffer plate 48 and the vent ring 23 are in this position, no air can pass into the area of the firebox 12 which contains the fuel. Subsequently, when the air inside the closed area is used up by the combustion of the fuel, the fuel stops burning.

Figure 5:
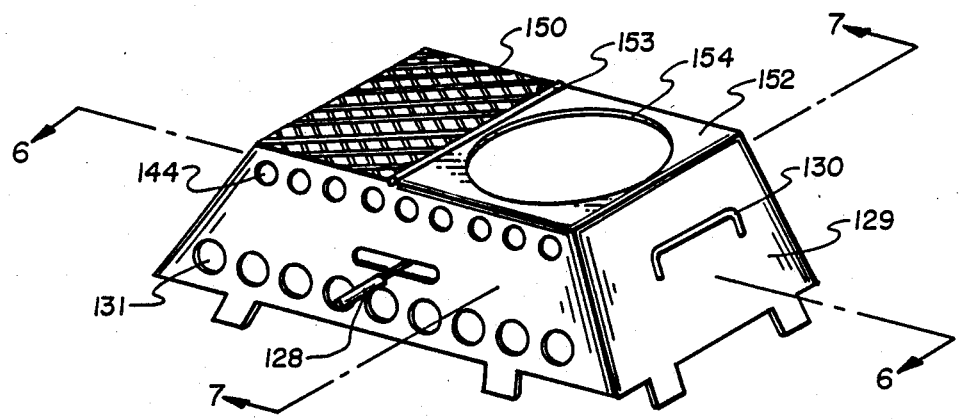
FIG. 5 is a perspective view of a second embodiment of the present invention.
Figure 6:
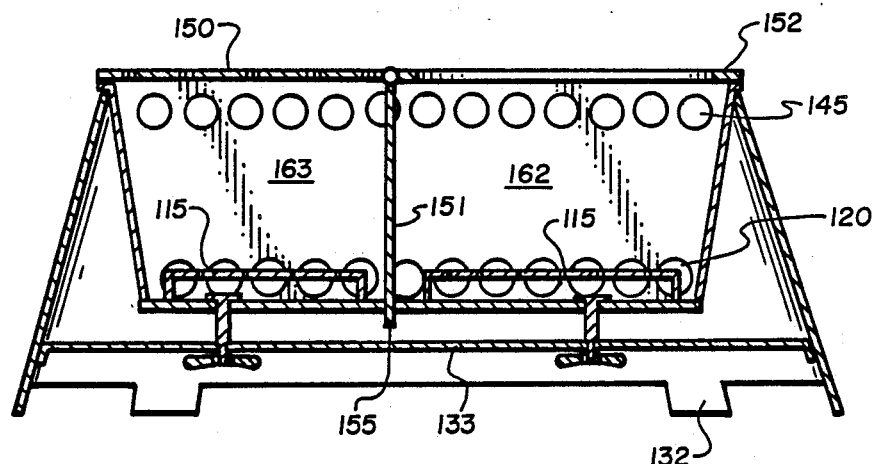
FIG. 6 is a cross-sectional view of the invention taken along lines 6—6 of FIG. 5.

FIG. 5 shows another embodiment of the invention. In this embodiment, the stove is semi-pyramidal in overall shape instead of semi-conical. The firebox body 117 is also semi-pyramidal in shape and sits inside the housing body 129 such that lip 118 rests on the rim 140 of the housing body 129. As is best seen in FIG. 6, grill 114 is extensively modified to allow for multiple simultaneous methods of cooking to be performed thereon. Grill 114 comprises an expanded wire mesh portion 150 hingedly connected by hinge 153 to a solid plate 151 and plate 152. Plate 151 is shaped to conform to the sides of firebox body 117 and firebox bottom plate 119 to effectively separate the firebox body interior into two compartments (162 and 163). Tab 155 passes through slot 156 in the firebox bottom 119 in order to secure plate 151 in place. Plate 152 contains opening 154 which is sized to allow the use of a wok or a Dutch oven or the like therein as has been previously described.

Figure 7:
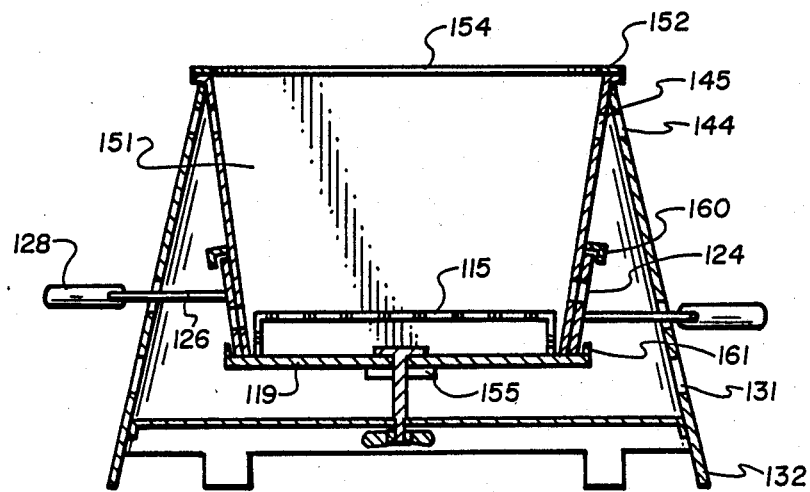
FIG. 7 is a cross-sectional view of the invention taken along lines 7—7 of FIG. 5.

FIG. 7 shows vent control arms 125 connected to venting of the venting control arms 125 causes alignment or disalignment of vent openings 124 with firebox body openings 120. Venting plate 123 rests on firebox bottom plate 119 and is held in place by securing elements 160 and 161. If desired, support arms may be attached to the rod 126 and vent plate 123 in order to lend lateral support to ease movement of the vent plate 123 by the handle 128.

The vent plates 123 as shown in FIG. 7 can alternatively be attached to the housing body 29 and then be made to slidably cover or open the holes 131 in generally the same manner as it is shown to slide relative to openings 120.

As is best seen in FIG. 6, each compartment of firebox body 117 contains its own coal rack 115. The heat generated by each compartment in the firebox body 117 can be somewhat controlled by the amount of charcoal placed on each coal rack 115.

Openings 45 as shown in the first embodiment (as best seen in FIG. 1), and openings 145 as shown in the second embodiment (as best seen in FIG. 6) allow hot air rising from the bottom of the firebox 12 to escape to the atmosphere in the event that a cooking utensil such as a wok or Dutch oven completely seals the top opening of the firebox body 17 or 117, as best seen in FIGS. 3 and 4. It should be noted here that snuffer plate 48 when placed inside the firebox body 17 to snuff the burning fuel, rests well below openings 45, thus making it possible to seal the fuel off from incoming air without the necessity of closing the openings 45.

Stove 10 is useful for several methods of cooking, including barbecuing, frying, broiling, steaming, and wok and Dutch oven cooking. The stove is used by first placing coals such as charcoal briquets onto the coal rack 15 in the bottom of the firebox 12. Because of the unique design of the firebox 12 and venting system 13, relatively fewer coals are needed to accomplish the desired cooking than are required by prior art devices. For example, 20 charcoal briquets evenly spaced on the rack 15 in the bottom of the firebox 12 is generally sufficient for the majority of cooking requirements.

Once the coals are evenly spaced on rack 15, and lighter fluid poured thereon if necessary, the vent control arm 25 is rotated to close openings 20 and prevent any airflow such as strong wind or the like from blowing out the fire before it gets started. It should be noted here that because of the relatively deep firebox 12, and the ability to completely close off airflow through the vents 20, there is no need to stack the coals in a pile or the like in order to ensure that they all properly ignite when lit. When the fire, created by the burning lighter fluid, extends above the lip 18 of the firebox body 17, the vent control arm 25 is rotated to align vent ring openings 24 with vent openings 20 to allow maximum airflow through the firebox 12. This commences the draft through the firebox and allows faster burning due to the greater air supply. This greatly reduces the start-up time required for the charcoal to be in a condition useful for cooking. This greater amount of air in the firebox 12, also causes the charcoal to burn more hotly and cleanly than has been possible in prior art devices When cooking is complete, the extremely hot temperature generated in the charcoal because of the drafting air, is capable of completely burning away any grease drippings or the like which have fallen from the grill. Also the charcoal itself will burn completely if not snuffed, leaving only a fine ash to remain in the bottom of the firebox once the burning is completed.

For barbecuing, once the coals are prepared in the manner above, the grill is laid over the firebox opening and held in place around lip 18. Food is then placed on grill 14 and cooked as desired. As has been noted above, however, contrary to prior art stoves, the food cooks substantially in the hot air rising from the bottom of the firebox 12, instead of in the radiant heat from the fire itself. This design helps prevent the food from burning and helps assure an attractive and appetizing color to the food after cooking. This design also keeps the food cleaner in that it is difficult for ashes and the like to rise up from the bottom of the firebox to the level of the food at the firebox opening. Also, in the case of cooking fatty meats, flare-ups caused by grease dripping from the meat into the coals, cannot rise back up to the level of the meat to cause burning.

Because the food is cooked in extremely hot air, rather than in the intense radiant heat of the coals, food will take slightly longer to cook, yet will be cleaner, with a more attractive and appetizing color, and be free from burning caused by flare-ups. Also, because the fuel burns much hotter and more completely than in prior art stoves, there is less smoke, carbon monoxide and other pollutants given off into the atmosphere.

The heat available for cooking can be controlled by adjusting the amount of hot air rising from the coals in the bottom of the firebox 12. By rotating the vent control arm 25, the amount of hot air available for cooking is directly regulated.

When it is desired to use the stove for frying, the above preparations are followed and the frying pan is merely placed directly on the grill 14. However, when using a wok-type frying pan as shown in FIG. 6, the grill is removed and the wok is set directly onto the lip 18 of the firebox 12.

As shown in FIG. 4, the invention can also be used in conjunction with a Dutch oven. The required number of coals for a particular recipe is placed in the firebox 12 and ignited. When the coals are ready for cooking, several coals are removed from the firebox and placed on the top of the Dutch oven. The particular number of coals and their arrangement on the top of the Dutch oven and on the fuel rack 15, is dictated by the particular recipe involved. For example, coals remaining in the firebox can be arranged into a circle to provide even heating to the sides and the bottom of the Dutch oven. The Dutch oven is then placed directly into the firebox 12 until it touches and is held in place by the firebox lip 18. When cooking is complete, the Dutch oven is removed from the firebox and the coals on the top of the Dutch oven are replaced into the firebox 12.

For broiling or steaming food, a utensil such as a pot, pan or steamer can be placed on top of grill 14, or grill 14 can be removed and the utensil can be placed into the firebox directly over the coals.

Once all cooking is complete, the coals can be allowed to burn out by completely opening the vent openings 20 to allow maximum airflow through the firebox. In approximately one hour, the coals will incinerate completely, along with any food that has fallen therein, and leave only a fine ash residue in the bottom of firebox 12.

If it is desired to snuff the coals instead of allowing them to burn completely, the snuffer plate 48 can be placed into the firebox body 17 until lip 49 seals against the interior surface thereof. The vent ring 23 is then rotated until openings 24 are completely disaligned with openings 20. At this point, air can no longer enter the area of the firebox which contains the fuel, and upon exhaustion of the air already trapped inside the portion of the firebox containing the fuel, the fuel will then extinguish. Following this procedure, it requires approximately ten minutes for the fuel to be extinguished. Also if desired, the entire stove 10 may be inverted, allowing the remaining fuel to be dumped out through the top opening of the firebox into a hole or other container useful for extinguishing.

It is contemplated that the stove 10 be made of any material capable of withstanding temperatures created by burning fuel, such as iron or steel or the like. Further, the handles 30 may be made of any material which is not substantially conductive to heat, such as a wood grip attached to the housing body 29 by metal support members. The venting ring 23 is advantageously made of stainless steel, in order to prevent rusting which would cause significant friction between the ring 23 and the exterior surface of the firebox body 17. The grill 14 and the coal rack 15 may also be made of steel or stainless steel, and may be formed either as an expanded wire mesh, or stamped from a metal plate. The material used for the housing 11 and the firebox 12 may be made of 20 gauge to 22 gauge metal. The bottom plate 19 of firebox 12 may be made of metal of a slightly thicker gauge, such as 18 gauge to 16 gauge in order to provide greater insulation and strength to the bottom of the firebox.

Although is contemplated that the stove 10 be used outdoors, since it is capable of more efficient and complete burning of fuel used therein, it can be used in any location having ventilation adequate for such purposes. For example, many indoor fireplaces may be large enough to accommodate the stove 10 and due to the stove's ability to draft air through the firebox 12, the drafted air would continue up through the fireplace flue as does the air heated by conventional fireplace fuel.

The snuffing plate 48 may also advantageously comprise a locking mechanism (not shown) which locks it in place inside the firebox body 17. With this feature, the fuel may be placed on the fuel rack 15 and snuffing plate 48 may be locked into position and the entire stove 10 would be prepared for use at some later time. For example, the fuel may be placed on fuel rack 15 and snuffing plate 48 may be locked in place above the fuel inside the firebox body 17, then other materials or utensils necessary for the contemplated cooking may be loaded into the remaining portion of the firebox on top of snuffing plate 48, and the entire stove 10 may be transported to the desired cooking location It is to be understood that the above-described arrangements are only illustrative of the application of the principles of the present inventon. Numerous modifications and alternative arrangements may be devised by those skilled in the art without departing from the spirit and scope of the present invention and the appended claims are intended to cover such modifications and arrangements.

What is claimed is:

1. A stove comprising:
   a housing having a body portion forming a top opening, bottom opening and side openings, and a bottom solid portion which completely closes said housing bottom opening, said housing bottom portion being larger in circumference than said top opening,
   a firebox located within said housing, said firebox having a body portion forming a top opening, a bottom opening and side openings, and a solid bottom portion which completely closes said firebox bottom opening, said firebox body top opening contacting said housing body at said housing body top opening,
   rack means located inside said firebox body, said rack means including a fuel holding portion having openings formed therein for allowing air circulation therethrough, and at least one leg portion for maintaining said fuel holding portion in a spaced apart relationship from said firebox bottom portion, at least one of said firebox body side openings having a portion thereof which opens into said firebox at a point between said rack means and said firebox bottom portion, and vent means for adjusting the size of at least a portion of said firebox body side openings, whereby, air flowing into said firebox through said firebox body side openings can circulate between said firebox bottom portion and said fuel holding means and through said rack means, and whereby said firebox bottom portion prevents escape of fuel or ash from said firebox, allowing the firebox bottom portion to inhibit heating of the housing bottom portion.

2. A stove according to claim 1 wherein said housing body portion and said firebox body portion are semiconical in shape.

3. A stove according to claim 2 wherein the diameter of said housing bottom portion is greater than the height of the stove.

4. A stove according to claim 1 wherein said vent means comprises means having openings formed therein located adjacent said at least a portion of said firebox body side openings which are movable relative thereto for adjusting the effective size of said at least a portion of said firebox body side openings, whereby, movement of said adjusting means effectively regulates the passage of air through said firebox body side openings.

5. A stove according to claim 1 further comprising snuffing means for forming a substantially airtight chamber in at least a portion of said firebox.

6. A stove according to claim 1 wherein the circumference of said firebox body top opening is larger than the circumference of said firebox body bottom portion.

7. A cooking stove according to claim 6 wherein said housing body portion and said firebox body portion are semi-pyramidal in shape.

8. A stove according to claim 1 wherein at least a portion of said venting means is stainless steel.

9. A stove according to claim 1 further comprising a second firebox.

10. A stove according to claim 9 further comprising a grill,
said grill having a first section and a second section attached together by a hinge means.

11. A stove according to claim 10 wherein said grill further comprises a third section attached at said hinge means, said third section functioning to separate said firebox from said second firebox.

12. A method of using a stove having
a housing having a body portion forming a top opening, bottom opening and side openings, and a bottom solid portion which completely closes said housing bottom opening, said housing bottom portion being larger in circumference than said top opening,
a firebox located within said housing, said firebox having a body portion forming a top opening, a bottom opening and side openings, and a solid bottom portion which completely closes said firebox bottom opening, said firebox body top opening contacting said housing body at said housing body top opening,
rack means located inside said firebox body, said rack means including a fuel holding portion having openings formed therein for allowing air circulation therethrough, and at least one leg portion for maintaining said fuel holding portion in a spaced apart relationship from said firebox bottom portion, at least one of said firebox body side openings having a portion thereof which opens into said firebox at a point between said rack means and said firebox bottom portion, and vent means for adjusting the size of at least a portion of said firebox body side openings, the method comprising the steps of:
supplying fuel to the firebox
igniting the fuel,
placing at least a portion of a cooking utensil over at least a portion of the firebox body top opening, and
cooking food in said utensil.

13. A method of using a stove according to claim 12 further comprising the step of:
snuffing the fuel in the firebox.

14. A method of using a stove as defined in claim 13 wherein said step of snuffing the fuel in the firebox further comprises:
placing a snuffing plate into the firebox through the top opening thereof to create an airtight seal between the snuffing plate and the bottom portion of the firebox, and
adjusting said vent means to substantially close off said bottom portion of said firebox body in an airtight manner.

15. A method of using the stove having
a housing having a body portion forming a top opening, bottom opening and side openings, and a bottom solid portion which completely closes said housing bottom opening, said housing bottom portion being larger in circumference than said top opening,
a firebox located within said housing, said firebox having a body portion forming a top opening, a bottom opening and side openings, and a solid bottom portion which completely closes said firebox bottom opening, said firebox body top opening contacting said housing body at said housing body top opening,
rack means located inside said firebox body, said rack means including a fuel holding portion having openings formed therein for allowing air circulation therethrough, and at least one leg portion for maintaining said fuel holding portion in a spaced apart relationship from said firebox bottom portion,
at least one of said firebox body side openings having a portion thereof which opens into said firebox at a point between said rack means and said firebox bottom portion, and
vent means for adjusting the size of at least a portion of said firebox body side openings,
the method comprising the steps of:
supplying fuel to the firebox,
igniting the fuel,
placing at least a portion of a cooking utensil into the firebox below the top opening thereof, and
cooking food in said utensil.

16. A method of using a stove as defined in claim 15 further comprising the steps of:
removing a portion of the ignited fuel from the firebox, and
placing said ignited fuel on the top of the utensil.

17. A method of making a stove comprising the steps of:
- forming a housing having a top opening, bottom opening and side openings therein, and a solid bottom portion, said bottom portion being larger than said top opening, and inserting said bottom portion into said housing body,
- forming a firebox body having a top opening, bottom opening and side openings therein, and a solid bottom portion, and inserting said firebox bottom portion into said firebox body,
- forming a rack means having a fuel holding portion formed with openings therethrough, and at least one leg element,
- placing said rack means inside said firebox body such that said fuel holding portion is held in spaced apart relationship with said firebox bottom portion by said leg element,
- forming a venting means having venting openings therein,
- attaching said venting means to said firebox body such that the venting openings are movable relative to said firebox body side openings, and
- placing said firebox body into said housing body such that the firebox body contacts the housing body at the top opening thereof.

18. A method of making a stove as described in claim 17 further comprising the steps of:
- forming a snuffing plate of a shape which conforms to an interior surface of said firebox body, and
- attaching said snuffer plate to said housing body.

* * * * *